United States Patent Office 3,428,815
Patented Feb. 18, 1969

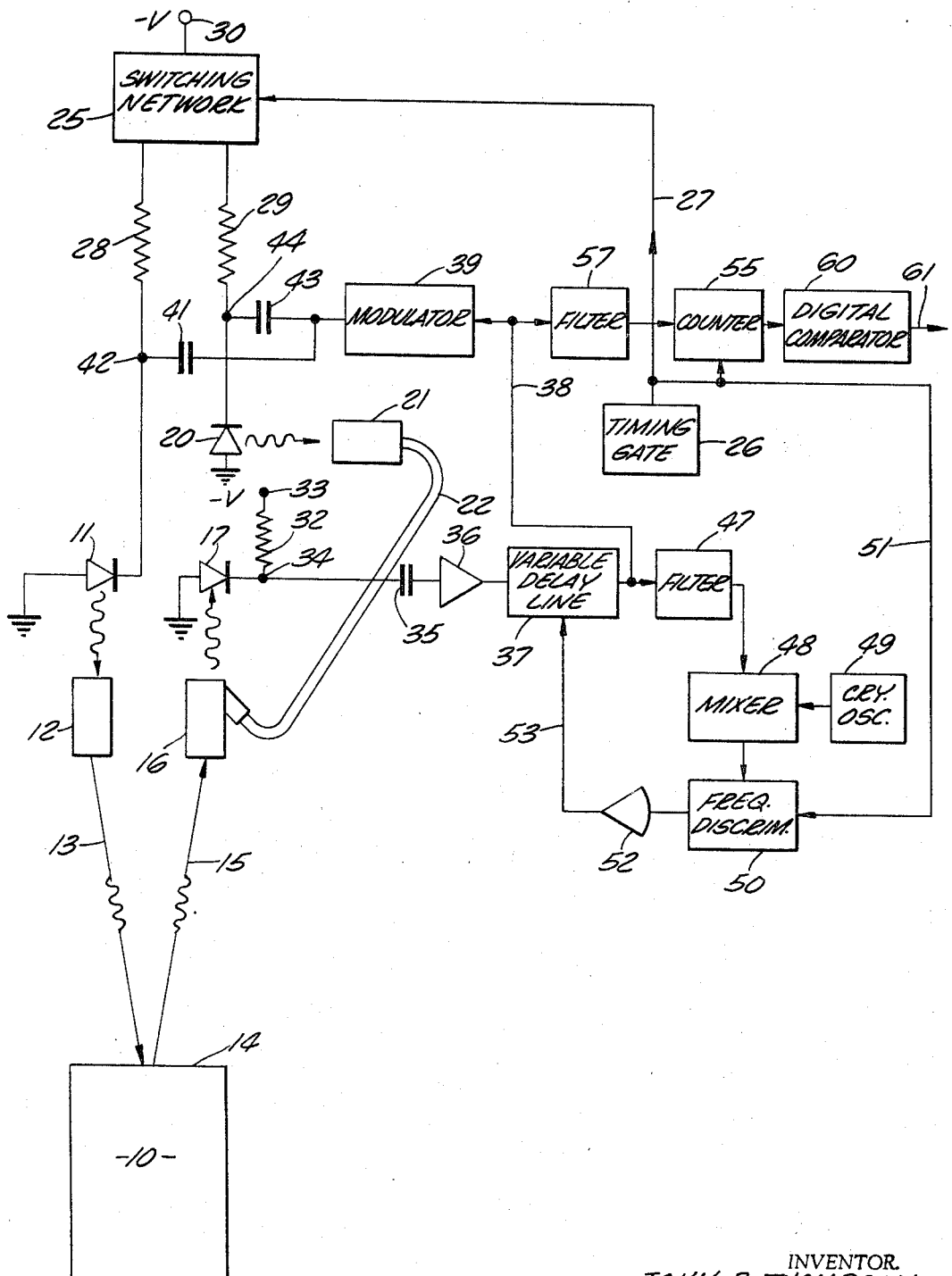

3,428,815
DISTANCE MEASURING SYSTEM USING INFRA-
RED RING-AROUND OSCILLATOR WITH A REF-
ERENCE LOOP HAVING A LIGHT CONDUCTING
ROD
John R. Thompson, Los Angeles, Calif., assignor to
Electronic Industrial Engineering, Inc., Los Angeles,
Calif., a corporation of California
Filed Oct. 22, 1965, Ser. No. 502,161
U.S. Cl. 250—217                    18 Claims
Int. Cl. G02f 1/34

ABSTRACT OF THE DISCLOSURE

A distance measuring system utilizing electro-magnetic radiation for measuring the distance between objects. Sending and receiving transducers, such as those responsive to infrared energy, direct and receive radiation with respect to a movable object, such as an elevator car. The wave path of radiation is in an electronic oscillation circuit, the output of which may be measured to determine the distance between the transducers and the movable object. A compensation circuit is integrally coupled with the system to compensate for or correct drifts and delay times in the system itself for reducing errors. The circuit includes an additional sending transducer which directs radiant energy to the receiving transducer over a fixed path.

---

This invention relates to distance measuring systems and more particularly to such systems utilizing electromagnetic radiation for measuring the distance between two objects, such as between an elevator car and a fixed point.

Over the years, various distance measuring systems have been devised for measuring the distance between objects, any one or more of which may be moving relative to another. An example of such systems includes those in which electrical signals are transmitted from one object to another and back to the first. The distance between the two objects is measured by determining the transit time of the signal. Radar systems and ultrasonic systems can measure distances in this manner. Many of the distance measuring systems known in the prior art are characterized by undue complexity, low accuracy, and/or high cost.

Accordingly, it is an object of the present invention to provide an improved distance measuring system.

Another object of the present invention is the provision of a distance measuring system having improved stability.

A further object of the present invention is the provision of a distance measuring system utilizing electromagnetic radiation, and in which compensation is provided for stabilizing the system.

It is yet another object of this invention to provide a distance measuring system including an electrooptical oscillator for determining the distance between two objects.

In accordance with an exemplary embodiment of the teachings of the present invention, a distance measuring system includes electromagnetic wave sending and receiving transducers arranged to respectively direct radiation toward, and receive radiation from, a movable object. The wave path of the radiation is included in an electronic oscillation circuit, the output of which may be measured to determine the distance between the transducers and the movable object. A compensation or calibration circuit also is integrally coupled into the system to compensate for or correct drifts and delay times in the system itself for reducing measurement errors. The electromagnetic wave radiation typically falls in the infrared or visible spectrum.

The distance measuring system of the present invention is particularly adaptable for measuring the distance of an elevator car from a fixed point. It will be appreciated by those skilled in the art that in automatic elevator systems it is necessary to continually monitor the position of the elevator in order that the control system therefor may be operated to position the elevator properly and accurately. For example, typical present day elevators for high rise buildings must operate quickly and be accurately leveled at each floor. Typical distance or position measuring systems for elevator cars include electro-mechanical systems for detecting the position of the car within the elevator shaft or hoistway. Switches may be included within the hoistway which are tripped by the elevator car as the car approaches and/or reaches each floor level. This arrangement generally is not accurate, not useful in high rise building elevator systems, and suffers from the particular disadvantage that the shaft must be entered in order to service the switches or tripping mechanism. Some elevator systems include measuring means coupled with the elevator cable to detect the position of the car. Other systems employ a steel tape coupled with the elevator and working through relatively complex gearing arrangements for tripping switches used for elevator car position control. These latter systems are by their very nature relatively mechanically complex, bulky and sometimes difficult to service. The mechanical components thereof wear out in time, generally must be lubricated, etc., thereby giving rise to substantial maintenance problems.

Accordingly, it is a still further object of the present invention to provide an improved distance or position measuring system for elevators.

An additional object of this invention is to provide an improved distance measuring system for measuring elevator car position which may be compact, reliable and accurate.

Other objects and features of this invention will become more apparent through a detailed consideration of the following description taken in conjunction with the drawing, the single figure of which illustrates a measuring system embodying the concepts of the present invention.

Although the concepts of the present invention are applicable to distance and position measurement of various objects, an exemplary system will be described in connection with elevator position measurement as a typical example of the system's application. However, no limitation to this particular application is intended thereby.

Referring now to the drawing, an elevator car is diagrammatically represented by a rectangular box 10. An electromagnetic wave sending transducer, represented by a radiation emitting diode 11 is arranged with respect to a lens system 12 to direct radiation along a first path 13 toward the top surface 14 of the elevator car 10. The radiation is reflected from the top surface 14 of the elevator car 10 along a second path 15 and is passed through a lens system 16 to a receiving transducer represented by an electromagnetic wave detecting diode 17. As an example, the sending transducer 11 may comprise a semiconductor diode which emits light in the infrared spectrum or in the visible spectrum when a suitable current is passed therethrough. An example of such diodes are gallium arsenide, gallium phosphide and indium arsenide and diodes having selenium as a constituent thereof. The lens system 12 is selected to pass and focus the radiant energy at the wave length emitted by the transducer 11 along the path 13. The lens system 16 is similar to the lens system 12 and serves to receive the reflected energy along the path 15 and direct it toward the receiving transducer 17. Preferably, the receiving transducer 17 may comprise a photo diode having its peak spectral response identical with, or close to, the energy emitted by the sending transducer 11. Upon receipt of energy from the lens system 16, the diode 17 turns on (i.e., passes current). It will be appreciated, that other electromagnetic wave emitting devices, such as a laser, may be employed as the sending transducer 11. The primary criteria in selecting the transducers 11 and 17 is that they should have similar spectral emission and response characteristics, and that the receiving transducer emit energy of sufficient intensity to be reflected from the movable object and stimulate the receiving transducer 17. Additionally, the sending transducer 11 must be capable of being modulated at a relatively high frequency, such as in the kilocycle range and above, and the receiving transducer be respective thereto.

A second sending transducer 20, preferably the same as the sending transducer 11, also is employed in the system. The second transducer 20 may be referred to as a reference signal transducer, and emits radiation through a lens system 21 which is coupled through an optical delay line 22 and the lens system 16 to direct energy onto the receiving transducer 17. Preferably, the optical delay line 22 is a fiber optic delay line and the transducer 20 emits radiation within the spectral transmission range thereof. As will appear subsequently, the transducer 20, lens system 21 and delay line 22 form a portion of a reference oscillation loop utilized for system compensation; whereas the transducer 11, lens system 12, and wave paths 13 and 15 comprise a portion of a sample oscillation system, the frequency thereof indicating the position of the elevator car 10.

A switching network 25 is provided for turning on either the transducer 11 or the transducer 20. This switching network 25 is controlled by a timing gate 26, which will be described in greater detail subsequently, having its output connected through a line 27 to the switching network 25. The output of the switching network 25 is connected through a resistance 28 and the diode 11 to ground, and through a resistance 29 and the diode 20 to ground. A terminal 30, adapted to be connected to a source of negative voltage, is connected to the switching network 25. Signals supplied from the timing gate 26 through the line 27 to the switching network 25 cause the latter to switch a negative voltage to either the resistance 28 or the resistance 29 for turning on the respective diode 11 or 20. When either of these diodes is on, it emits radiation through its respective lens system 12 or 21 to its associated wave path.

The diode 17 is coupled in series with a resistance 32 between ground and a terminal 33 adapted to be connected to a source of negative voltage. A junction 34 between the resistance 32 and the diode 17 is coupled through a capacitance 35 to the input of a stable high frequency amplifier 36. Preferably the amplifier 36 has a very fast response time, is stable and drift or jitter free. The output of the amplifier 36 is connected through a variable delay line 37 and a line 38 to the input of a modulator or switching circuit 39. The variable delay line 37 provides a controllable delay to the signal applied thereto and may include any of various well known circuits. For example, the delay line 37 may include a series inductance shunted to ground through a reverse biased voltage controlled silicon capacitor, wherein the voltage applied to the capacitor controls the delay in propagation time of the signal through the circuit. The output of the switching circuit 39 is coupled through a capacitor 41 to a junction 42 between the resistance 28 and the diode 11, and through a capacitor 43 to a junction 44 between the resistance 29 and diode 20 to selectively turn off either of the diodes 11 or 20. Typically, a positive signal will be applied to either of the junctions 42 or 44 to turn off the respective diode 11 or 20.

Assuming that the diode 20 is turned on by the switching network 25, it emits radiation through the lens system 21, the delay line 22 and the lens system 16 to the diode 17. The diode 17 turns on thereby generating a signal which is amplified by the amplifier 36 and passed through the delay line 37 and the line 38 to turn on the switching circuit 39. When the switching circuit 39 turns on, it applies a pulse to the junction 44 to turn off the diode 20 which in turn ceases to emit radiation. The diode 17 then turns off terminating the signal applied through the amplifier 36, the delay line 37 and the line 38 to the switching circuit 39 causing the switching circuit 39 to turn off. When the switching circuit 39 turns off, the diode 20 again turns on (with the switching network 25 still enabling the diode 20), and the cycle of operation is repeated. Thus, the circuit just described provides a relaxation type oscillation, the frequency of which is dependent upon the length (which is constant) of the delay line 22 and the propagation delay of the electronic circuits in the reference loop.

The output of the variable delay line 37 also is applied through a filter circuit 47 to one input of the mixer 48. It will be appreciated, that the filter circuit 47 is tuned to pass the signal frequency of the reference loop described above. An oscillator 49, preferably a crystal oscillator which generates a stable frequency output signal, is coupled to supply a local oscillator signal to the mixer 48. The mixer 48 provides an output difference frequency which is applied to and detected by a frequency discriminator 50. The frequency discriminator 50 provides a positive or negative error signal output depending upon the direction of excursion of the reference loop frequency signal from the local oscillator frequency signal supplied by the oscillator 49. The frequency discriminator 50 has a gate input which receives signals through a line 51 from the timing gate 26. For reasons to be explained in greater detail subsequently, the frequency discriminator 50 is enabled, or turned on, only when the switching network 25 enables the reference transducer diode 20.

The output of the frequency discriminator is integrated by an integrator 52 which serves to hold the error signal when the frequency discriminator 50 is not enabled by the timing gate 26. The output of the integrator 52 is applied through a line 53 to the variable delay line 37 to control the signal delay thereof. Thus, the output of the integrator 52 adjusts the delay of the variable delay line 37 so that the reference loop oscillation is adjusted to the center frequency of the frequency discriminator 50 which then provides a zero output error signal. Hence, the circuit including the filter circuit 47, the mixer 48, the oscillator 49, the discriminator 50, and the integrator 52 serves to lock the relaxation oscillator frequency of the reference loop. When this frequency is locked, the propagation delay of the electronic circuitry within the loop is calibrated and any drift is automatically corrected by the discriminator circuit loop. Thus, during distance measurements, the electronic circuit delay time will remain constant and not contribute errors.

After the calibration, which typically may occur once each millisecond, the system switches into a sample or distance measuring mode. The timing gate 26 switches the switching network 25 to enable the transducer 11 rather than the transducer 20. The timing gate 26 also switches off the frequency discriminator 50 and switches on a conventional counter 55 at this time. The diode 11 emits radiation through the lens system 12 along the wave path 13. The radiation is reflected by the surface 14 along the wave path 15 and through the lens system 16 to the diode 17. The diode 17 turns on as before generating a signal which is amplified by the amplifier 36 and passed through the variable delay line 37 and the line 38 to turn on the switching circuit 39. The switching circuit 39 then turns off the diode 11 in the same manner in which it turned off the diode 20 previously. This loop including the paths 13 and 15, may be defined as the sample or distance measuring loop as distinguished from the reference loop described previously which includes the delay line 22.

As in the case of the reference loop, a relaxation type oscillation is generated in the measuring loop, the frequency of which is determined by the path length of the paths 13 and 15. Thus, the frequency of oscillation of the sample or distance measuring loop is directly proportional to the distance of the reflecting surface 14 from the sending and receiving transducers 11 and 17. Preferably, the timing gate 26 provides output signals causing the reference loop to be quickly calibrated but allowing the sample loop a longer time in which to make a measurement. That is, the timing gate 26 enables the transducer 11 longer than it enables the transducer 20.

The signal frequency of the sample or measuring loop is blocked by the filter circuit 47, but is passed by a filter circuit 57. The output of the filter circuit 57 is applied to the input of the counter 55, which is enabled by the timing gate 26 during a distance measurement as mentioned above, and which counts the measurement frequency. The output of the counter 55 may be utilized in any of various ways in a distance measuring system. For example, the counter 55 may provide a visual output indicating distance in feet, inches, etc. Typically, the electrical output of the counter 55 is processed by digital circuitry which in turn provides output signals for control purposes, such as for control of elevator speed or position.

For elevator position control for example, the output of the counter 55 may be applied to a digital comparator and output switching circuit 60 which provides output signals on a line 61 indicative of elevator position. The digital comparator 60 may have stored therein a plurality of sets of digits corresponding to floor positions, with the output of the counter 55 being compared with a set of digits thereby enabling the comparator 60 to provide an output signal when equality is reached. Various elevator hall buttons may be coupled with the digital comparator 60 to select a set of digits corresponding to floor, and when the output of the counter 55 equals this set of digits an output signal is provided to stop or slow down the elevator. A number of sets of digits may represent each floor position so that when the output of the counter 55 is equal to a respective set of digits, successive output signals are provided to slow down the elevator, and then stop the elevator. The digital comparator 60 may include self-checking circuitry to turn off associated equipment, such as an elevator system, or to provide an alarm in the event a proper or reasonable measurement is not achieved.

After each sample or distance measuring period, which typically ranges from one-hundredth to five-hundredths of a second, a calibration or reference period which is substantially shorter occurs. During the calibration period, the counter 55 is reset and does not count, and the electronic circuit propagation delay correction is made. Another distance measuring period follows, and the cycle of operation continues. A typical range of operation (length of the path 13 or path 15) for an elevator system may be between ten and one thousand feet with a measuring accuracy of one-fortieth of an inch by sampling each five-hundredth of a second and utilizing a fifty megacycle counter. The delay provided by the delay line 22 is selected to be sufficient to reduce the reference relaxation oscillation to within the counter capability. Even greater accuracies may be achieved and are dependent upon the propagation stability of signals through the system other than through the free air sample paths 13 and 15, the number of significant digits to be counted, and the sample time provided (a greater sample time enables more significant digits to be measured). If an absolute measurement is desired in feet, inches, etc., it will be appreciated that the sample loop frequency should be divided by two because of the two paths 13 and 15 to and from the reflecting surface 14. For elevator distance measurements, the paths 13 and 15 are selected so as not to be interferred with by elevator cables, and the like. If the sending transducer 11 emits radiation of low intensity, it is desirable to provide a good reflector, such as a mirror, on the surface 14. For elevator use, preferably infrared radiation is utilized so as not to create potential dangers to the eye sight of maintenance personnel who might gaze into the radiation beam.

It will be understood that although an exemplary embodiment of the present invention has been disclosed and discussed, other circuit arrangements, structural arrangements and applications are possible and that the embodiment disclosed may be subjected to various changes, modifications, and substitutions without necessarily departing from the spirit of the invention.

What is claimed is:

1. In a distance measuring system for measuring the position of an object, the combination comprising:
   first and second transducer means for respectively sending and receiving radiation along a variable length path;
   third transducer means for sending radiation along a fixed length path to said second transducer means;
   first means coupled with said first and third transducers to control the operation thereof;
   second means coupled with said second transducer and responsive to the receipt of radiation thereby for controlling the operation of said first means, said second means including frequency control means coupled therewith for controlling the frequency of operation of said third transducer means, and
   third means coupled with said second means for sensing the frequency of operation of said first transducer means, the frequency of operaiton of said first transducer means being proportional to the length of said variable length path.

2. In a distance measuring system for measuring the position of an object, the combination comprising:
   first transducer means for emitting electromagnetic wave energy along a first path toward an object;
   second transducer means for receiving said electromagnetic wave energy reflected from said object along a second path;
   third transducer means for emitting electromagnetic wave energy along a third path of fixed length to said second transducer means;
   first circuit means coupled with said first and third transducer means to control the electromagnetic wave energy emission thereof;
   second circuit means coupled with said second transducer means and to said first circuit means to control the operation of said first circuit means upon the reciption of electromagnetic wave energy by said second transducer means;
   third circuit means coupled with said second circuit means for affecting the operation thereof whereby reference frequency oscillations are set up in a circuit loop including said third path, and said third circuit means functions to correct the operation of said system, and
   fourth circuit means coupled with said second circuit means for providing an output signal which is a function of the length of said first and second paths.

3. In a distance measuring system for measuring the position of an object, the combination comprising:
   first transducer means for emitting radiation toward an object along a first path;
   second transducer means for receiving said radiation reflected from said object along a second path;
   third transducer means for emitting radiation along a third path of fixed length to said second transducer means;
   switching means coupled with said first and third transducer means to enable said first and third transducer means to emit radiation;
   circuit means including variable delay means coupled to said second transducer means and said switching means and responsive to the receipt of radiation by said second transducer means to disable said switching means;
   frequency control circuit means coupled with said circuit means and responsive thereto for controlling said delay means, whereby a loop including said third path and said delay means oscillates at a reference frequency, and frequency counting means coupled with said circuit means and responsive to the output thereof when said first transducer means is enabled by said switching means for providing an output signal which is a function of the length of said first and second paths.

4. A distance measuring system comprising:
measuring oscillation means;
reference oscillation means;
counting means coupled with said measuring oscillation means to provide an indication of the frequency of oscillation thereof;
frequency control means coupled with said reference oscillation means to control the frequency of operation thereof;
first, second and third transducer means;
said first transducer means being included in said oscillation means and selectively controlled to emit radiation along a variable length path;
said third transducer means being included in said reference oscillation means and selectively controlled to emit radiation along a fixed length path, and
said second transducer means being common to both said measuring and said reference oscillation means for receiving radiation emitted by said first and third transducer means respective along said variable and fixed paths.

5. A distance measuring system comprising:
first, second and third transducer means, said first transducer means emitting radiation along a variable length path, said third transducer means emitting radiation along a fixed path, and said second transducer means receiving radiation emitted by said first and second transducer means;
control means for controlling the rate of emission of radiation by said first and third transducer means;
circuit means responsive to the receipt of radiation by said second transducer means for disabling said control means, the rate of emission of said first transducer means being substantially proportional to the length of said variable length path and the rate of emission of said third transducer means being substantially proportional to the length of said fixed length path;
frequency control means coupled with said circuit means for controlling the delay thereof thereby maintaining the rate of emission of said third transducer means at a reference frequency, and
frequency determining means coupled with said circuit means for providing an output signal proportional to the rate of emission of said first transducer means.

6. A distance measuring system comprising:
first, second and third transducer means, said first transducer means emitting infrared radiation along a variable length path, said third transducer means emitting infrared radiation along a fixed length path, and said second transducer means receiving radiation emitted by said first and second transducer means;
switching means for controlling the rate of emission of radiation by said first and third transducer means;
circuit means responsive to the receipt of radiation by said second transducer means for disabling said switching means, the rate of emission of said first transducer means being substantially proportional to the length of said variable length path and the rate of emission of said third transducer means being substantially proportional to the length of said fixed length path;
means coupled with said coupled means for maintaining the rate of emission of said third transducer means at a reference frequency, and
frequency measuring means coupled with said circuit means for providing an output signal proportional to the rate of emission of said first transducer means.

7. In an elevator system including means for positioning an elevator car, a system for determining the position of said elevator car comprising:
first transducer means for emitting radiant energy along a first path toward said elevator car;
second transducer means for receiving said radiant energy reflected along a second path from said elevator car;
third transducer means for emitting radiation along a third path of fixed length to said second transducer means;
first circuit means coupled with said first and third transducer means to control the rate of emission thereof;
second circuit means coupled to said second transducer means and to said first circuit means for repeatedly generating first and second signals when said second transducer means receives radiation respectively reflected by said elevator car and emitted by said third transducer means to thereby cause said first circuit means to disable respectively said first transducer means or said third transducer means, and to allow said first circuit means to respectively enable said first transducer means or said third transducer means each time said respective first or second signal terminates, and
frequency measuring means coupled with said second circuit means and responsive to said first signals generated thereby for providing output signals indicative of the position of said elevator car.

8. A system as in claim 7 wherein:
said frequency measuring means includes a counter and a digital comparator for comparing the output of said counter with data stored in said digital comparator.

9. A distance measuring system comprising:
first transducer means for emitting radiation along a first path toward an object;
second transducer means for receiving said radiation reflected from said object along a second path;
third transducer means for emitting radiation along a third path to said second transducer means;
first circuit means coupled with said first and third transducer means and responsive to first and second control signals for turning on or off the radiation emitted by said respective first or third transducer means;
second circuit means coupled with said second transducer means and to said first circuit means to cause said first circuit means when conditioned by said first signal to turn off said first transducer means upon the reception of radiation by said second transducer means along said second path and to turn on said first transducer means upon the termination of reception of radiation by said second transducer means along said second path thereby generating first oscillating signals, and to cause said first circuit means when conditioned by said second signal to turn off said third transducer means upon the reception of radiation by said second transducer means along said third path and to turn on said third transducer means upon the termination of reception of radiation along said third path thereby generating second oscillating signals, and
counting means coupled with said second circuit means for providing an output signal proportional to said first oscillating signals, said output signals being a function of the length of said first and second paths.

10. A distance measuring system comprising:
first transducer means for emitting radiation along a first path toward an object;
second transducer means for receiving said radiation reflected from said object along a second path;
third transducer means for emitting radiation along a third path of fixed length to said second transducer means;

switching means coupled with said first and third transducer means to turn on and off either said first or said third transducer means thereby causing said respective first or third transducer means to emit radiation;

circuit means including variable delay means coupled to said second transducer means and to said switching means and responsive to the receipt of radiation by said second transducer means to turn off either said first or said third transducer means turned on by switching means, and to again turn on either said respective first or third transducer means upon the termination of receipt of radiation by said second transducer means;

frequency control circuit means coupled with said circuit means for controlling said delay means;

frequency counting means coupled with said circuit means and responsive to signals passed by said variable delay means when said first transducer means is enabled by said switching means for providing an output signal which is a function of the length of said first and second paths, and timing means coupled with said switching means, said frequency control circuit means and said frequency counting means for controlling the operation thereof.

11. A distance measuring system comprising:

a first electro-optical oscillation loop including a first transducer means for emitting radiation along a variable length path toward a second transducer means, switching means for turning on and off said first transducer means, and circuit means for disabling said switching means;

said switching means being connected to said first transducer means, said second transducer means being coupled to said circuit means and said circuit means being coupled to said switching means, said second transducer means providing a first output signal through said circuit means upon receipt of radiation along said variable length path to cause said switching means to disable said first transducer means and to cause said switching means to enable said first transducer means upon termination of receipt of radiation along said variable length path thereby generating first oscillating signals of a frequency proportional to said variable length path;

a second electro-optical oscillation loop including third transducer means for emitting radiation along a fixed length path toward said second transducer means, said switching means and said circuit means, said second transducer means providing a second output signal through said circuit means upon receipt of radiation from said third transducer means along said fixed length path to cause said switching means to disable said third transducer means and to cause said switching means to enable said third transducer means upon the termination of receipt of radiation along said fixed length path thereby generating second oscillating signals at a reference frequency;

frequency control means coupled with said circuit means and enabled when said switching means turns on said third transducer means to control the frequency of said second loop, and frequency counting means coupled with said circuit means and enabled when said switching means turns on said first transducer means to count said first oscillating signals.

12. An oscillator comprising:

a light source;

light responsive means;

a light delay line coupled between said light source and said light responsive means;

switching means coupled to said light source for turning on and off said light source;

first circuit means coupled to said light responsive means and to said switching means for repeatedly generating a signal when said light responsive means receives light from said light source to cause said switching means to turn off said light source and to allow said switching means to turn on said light source each time said signal terminates, and frequency control means coupled with said circuit means for controlling the delay of the signals generated by said circuit means and causing said signals to be generated at a substantially fixed frequency.

13. In an elevator system including means for positioning an elevator car, a system for determining the position of said elevator car comprising first transducer means for emitting radiant energy along a first path toward said elevator car, second transducer means for receiving said radiant energy reflected along a second path from said elevator car, first circuit means coupled with said first transducer means to control the rate of emission thereof, second circuit means coupled to said second transducer means and to said first circuit means for repeatedly generating a signal when said second transducer means receives radiation reflected by said elevator car from said first transducer means to thereby cause said first circuit means to disable said first transducer means, and to allow said first circuit means to enable said first transducer means each time said signal terminates, said second circuit means including variable delay means having an input coupled with said second transducer means and an output coupled with said first circuit means, said first circuit means being coupled to reference transducer means to control the rate of emission thereof, said second transducer means being responsive to radiant energy directed along a reference path from said reference transducer means, and third circuit means coupled with said output of said second circuit means and responsive to the signals generated thereby for providing output signals indicative of the position of said elevator car.

14. A distance measuring system comprising first transducer means for emitting radiation along a first path toward an object, second transducer means for receiving said radiation reflected from said object along a second path, first circuit means coupled with said first transducer means for turning on and off the radiation emitted thereby, second circuit means coupled with said second transducer means and to said first circuit means to cause said first circuit means to turn off said first transducer means upon the reception of radiation by said second transducer means and to cause said first circuit means to turn on said first transducer means upon the termination of reception of radiation by said second transducer means, thereby generating oscillating signals, said second circuit means including variable delay means having an input coupled with said second transducer means and an output coupled with said first circuit means, said first circuit means being coupled to reference transducer means for turning on and off the radiation emitted by said reference transducer means, said second transducer means being responsive to radiation emitted along a reference path from said reference transducer means, and counting means coupled with said second circuit means for providing an output signal proportional to said oscillating signals, said output signal being a function of the length of said first and second paths.

15. An oscillator comprising first and second light sources, light responsive means positioned to receive light from said first light source over a variable length path, a light delay line positioned between said second light source and said light responsive means, switching means coupled to said light sources for turning on and off each of said light sources, and circuit means coupled to said light responsive means and to said switching means for repeatedly generating a signal when said light responsive means receives light from either of said sources to cause said switching means to turn off the light source from which light is received and to allow said switching means to turn on said light source from which light is received each time said signal terminates.

16. An oscillator comprising first and second light sources, light responsive means positioned for receiving light from said first light source over a variable length path, a light delay line positioned between said second light source and said light responsive means, switching means coupled to said light sources for turning on and off each of said light sources, said switching means including network means for selectively conditioning one or the other of said light sources and modulator means for turning on and off the conditioned source, and circuit means coupled to said light responsive means and to said modulator means for repeatedly generating a signal when said light responsive means receives light from either of said sources to cause said modulator means to turn off the light source from which light is received and to cause said modulator means to turn on said light source from which light is received each time said signal terminates.

17. An oscillator comprising first and second light sources providing radiant energy within the infrared spectrum, light responsive means responsive to radiant energy in the infrared spectrum, said light responsive means being positioned to receive light from said first light source over a variable length path, a light delay line positioned between said second light source and said light responsive means, switching means coupled to said light sources for turning on and off each of said light sources, said switching means including network means for selectively conditioning one or the other of said light sources and modulator means for turning on and off the conditioned source, and circuit means coupled to said light responsive means and to said modulator means for repeatedly generating a signal when said light responsive means receives light from either of said sources to cause said modulator means to turn off the light source from which light is received and to cause said modulator means to turn on said light source from which light is received each time said signal terminates.

18. An oscillator comprising first and second radiant energy sources, switching network means coupled with said radiant energy sources for selectively conditioning one or the other of said sources, radiant energy responsive means positioned to receive radiant energy from said first source over a variable length path, radiant energy delay line means positioned between said second source and said radiant energy responsive means, switching means coupled to said sources for turning on and off the source conditioned by said switching network means, variable delay means having an input coupled with said radiant energy responsive means and having an output coupled with said switching means for repeatedly generating a signal when said radiant energy responsive means receives radiant energy from either of said sources to cause said switching means to turn off the source from which radiant energy is received and to cause said switching means to turn on said source from which radiant energy is received each time said signal terminates, and frequency control means coupled with said variable delay means for controlling the delay of signals generated by said variable lay means and causing said signals to be generated at a substantially fixed frequency.

References Cited

UNITED STATES PATENTS

| | | | |
|---|---|---|---|
| 2,418,964 | 4/1947 | Arenberg | 350—160 |
| 2,454,772 | 11/1948 | Chatterjea et al. | 343—7.5 |
| 3,268,733 | 8/1966 | Deelman et al. | 250—217 |

RALPH G. NILSON, *Primary Examiner.*

M. ABRAMSON, *Assistant Examiner.*

U.S. Cl. X.R.

331—66; 343—7.5; 187—29; 250—214, 220, 222; 88—1